Oct. 21, 1924.          1,512,482
R. J. PATTERSON
ELECTRIC COOKER
Filed Oct. 17, 1923
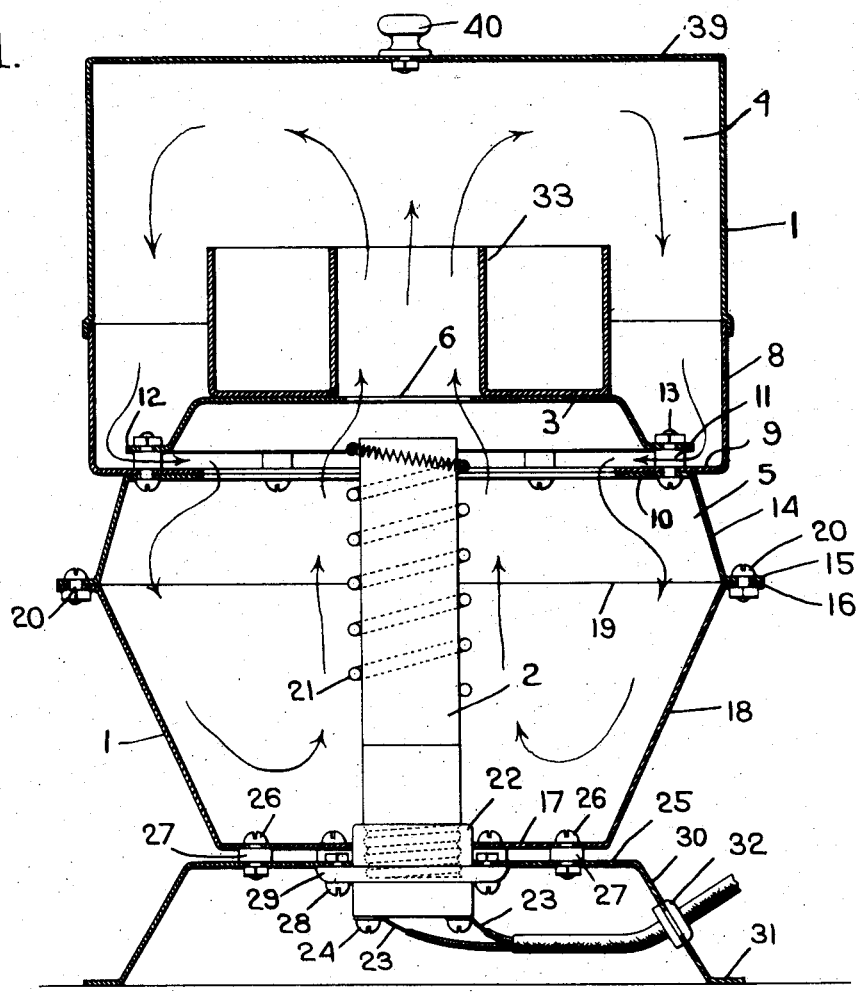
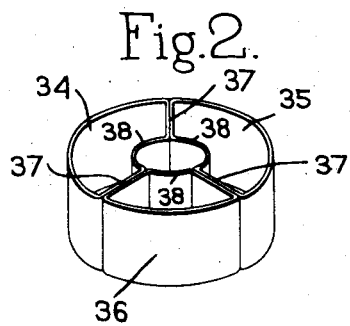
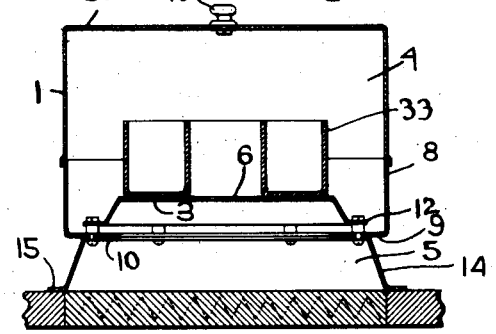
Inventor.
Ralph J. Patterson
by Heard Smith & Tennant
Attys.

Patented Oct. 21, 1924.

1,512,482

UNITED STATES PATENT OFFICE.

RALPH J. PATTERSON, OF WATERTOWN, MASSACHUSETTS.

ELECTRIC COOKER.

Application filed October 17, 1923. Serial No. 669,042.

*To all whom it may concern:*

Be it known that I, RALPH J. PATTERSON, a citizen of the United States, and resident of Watertown, county of Middlesex, State of Massachusetts, have invented an Improvement in Electric Cookers, of which the following description, in connection with the accompanying drawing, is a specification, like characters on the drawing representing like parts.

This invention relates to an electric cooker having a chamber containing a heating element with a baffle situated above the heating element in such a manner that a closed circulation of air is established within the chamber.

The usual ovens are merely closed chambers which are placed above a source of heat and have a door in them so that the articles to be cooked may be placed in or removed from the oven. With this type of oven the air which is enclosed within the oven is more or less stagnant and when the foods are cooked in such an oven it often happens that one side of a cooking vessel is highly heated and the other side is only slightly heated with the result that the food is not evenly cooked. Attempts have been made to remedy this condition by providing mechanical means to circulate the air but such construction necessitates the use of auxiliary apparatus in connection with the oven. Other attempts have been made to obtain a circulation of air by providing openings through the walls of the oven from which the heated air, after it has passed over the cooking vessel containing the food, is permitted to escape from the oven with the consequent loss of heat, this type being especially applicable in connection with a gas heating element as it permits the products of combustion to escape.

One of the objects of the present invention is to provide an electric cooker constructed so that when in use a continuous closed circulation of air will be established upwardly at the central portion of the cooking or baking chamber and downwardly along the walls thereof. This manner of circulation is very effective in evenly cooking the food and is also economical as none of the heated air is permitted to escape from the oven and the only loss of heat is that due to radiation, thus rendering the oven very efficient.

A further object of the invention is to provide an oven which is inexpensive to manufacture.

Other objects and features of the invention will more fully appear from the following description and the accompanying drawings.

In order to give an understanding of the invention I have illustrated in the drawings a selected embodiment thereof which will now be described, after which the novel features will be pointed out in the appended claims.

The drawings illustrate in perspective and elevation a preferred form of construction of an electric cooker and embody the broad principles of the invention.

In the drawings:

Fig. 1 is a vertical section through the cooker;

Fig. 2 is a perspective of one type of cooking vessel to be used with the cooker;

Fig. 3 is a section through the oven and the top part of the heating chamber showing the manner in which the cooker may be applied to a flat heating element.

The circulation of air, referred to above, is obtained in the present invention by providing an enclosed vessel containing a heating element and a re-circulating baffle situated above the heating element formed to present a central uptake opening and peripheral down-draft openings. This construction divides the vessel into an air heating chamber below the baffle and an oven above the baffle, said chamber and oven communicating with each other both through the central opening and the peripheral openings. In the operation of the cooker the air which is heated by the heating element rises naturally through the central uptake opening into the oven and the air in the oven which is cooled by contact with the walls thereof gravitates downwardly through the peripheral down-draft openings into the heating chamber where it is again heated so that it re-circulates through the central uptake opening into the oven.

In the preferred embodiment of the invention the heat is generated by an electric heating element which is placed in the heating chamber directly beneath the central uptake opening so that the air in the heating chamber upon contact with the heating element may rise directly from the heating element and pass through the central opening into the oven.

In order to permit the cooker to be used with various types of heating elements the air heating chamber may be made in two parts, an upper part and a lower part, which may be separated, and the upper part, with the oven attached and having the central and peripheral openings, may be removed from the lower part of the air heating chamber and used in connection with other types of heating elements such as a hot plate, as illustrated in Fig. 3. With this construction the cooker does not necessarily have to be used with an electric heater since the hot plate may be heated either by electricity or gas.

The preferred construction of the cooker is shown in the accompanying drawings and it comprises a casing 1 having an electric heating element 2 therein and a re-circulating baffle 3 situated above the heating element and dividing the casing into an oven 4 in which the cooking is done and a heating chamber 5 in which the heating element 2 is located. This re-circulating baffle has a central uptake opening 6 through which the air rises as it is heated, and peripheral down-draft openings 7 through which the cooled air gravitates from the oven 4 to the heating chamber 5.

In the construction shown the casing is made in two sections one of which forms the oven 4 and the other of which forms the heating chamber 5. The lower portion 8 of the wall of the oven has an inwardly extending flange 9 which rests on and is secured to the inwardly extending flange 10 at the top of the heating chamber. The baffle 3 which forms the center portion of the oven bottom is secured at its periphery to the flange 9 but is spaced therefrom by means of spacing members 11 which are arranged at regular intervals around the periphery of the oven bottom. With this construction the peripheral down-draft openings 7 through which the cooled air passes from the oven into the air heating chamber are the openings formed by the flange 12 of the baffle 5 and the flange 9 of the oven bottom and the spacing members 11. In order to provide a rigid construction the spacing members 11 are preferably in the form of washers surrounding bolts 13 which pass through the flange 10 of the air heating chamber and through the flange 9 of the oven bottom and through the flange 12 of the baffle 5. Nuts on the ends of the bolts permit the entire upper structure of the cooker to be taken apart for cleaning and also permit the parts to be tightened as much as desired to prevent any rattling which may result from the looseness of the parts.

The air heating chamber is made with an upper and a lower part which are separable from one another so that said upper part with the attached oven may be removed and used with various types of heating elements. The upper part comprises the flange 10 and a depending portion 14 having a flange 15 by means of which said upper portion may be attached to a corresponding flange 16 on the lower portion of the air heating chamber. The lower portion of the air heating chamber comprises a bottom 17 from which rises an upwardly extending portion 18 which in turn extends the flange 16. The upper and lower parts of the air heating chamber are separable from one another along a line 19 intermediate of the top and bottom of said chamber. The parts are removably connected by means of bolts 20 so that the upper part of the air heating chamber with the attached oven may be separated from the lower part of said chamber.

The preferred type of heating element, as illustrated in Fig. 1, is a cylindrical insulator having wound thereon a resistance coil 21 and removably held in an insulating socket 22. Service wires 23 are connected to the insulating socket by means of screws 24, electric connection being made through the socket and between the resistance coil of the heater and the service wires 23 in any suitable manner.

The entire cooker is supported on any suitable base. The preferred base has a flat top 25 to which the bottom of the air heating chamber is removably connected by means of bolts 26. Spacing members 27 of any suitable type are interposed between the base and heating chamber in order that air may circulate between the bottom of the heating chamber and the top of the base to prevent the base from becoming heated and injuring the table or other article of furniture on which the cooker may be placed. The socket 22 is preferably supported on the top of the base by means of bolts 28 which engage a flange 29 on the socket and pass through openings in the top of the base. The base has a depending portion 30 from the lower edge of which extends a flange 31 which rests on the table or other suitable support. The wires 23 are insulated from the base by means of a suitable insulating collar 32.

The cooking vessel, or vessels, 33 which are to be used in connection with the cooker are placed on the baffle 3 surrounding the opening 6 in such manner that the heated air may pass upwardly through the center of the cooking vessels. One type of combined cooking vessel is illustrated in Fig. 2 and comprises three separate vessels 34, 35 and 36 having separating walls 37 and inner walls 38 so arranged that when the vessels are placed closely together, an opening is left in the center directly above the opening 6 in the baffle.

The oven may be closed by any suitable top 39 which may have a handle 40 thereon for the convenience of the operator.

The circulation of the air in the cooker is illustrated by the arrows. As will be seen, a closed circulation is established through the oven and heating chamber and the heated air which passes upward into the oven through the central opening circulates through the oven and down along the walls thereof and through the peripheral openings into the heating chamber where it is re-heated and re-circulated to the oven again through the central opening. The air is in continual circulation and does not leave the cooker since there are no openings permitting the escape of air from the cooker into the surrounding space and the only loss of heat is a comparatively small loss due to radiation. The circulation of air is entirely due to the natural buoyancy of the heated air rising from the heating element, and the primary cause of the circulation is the fact that there is a central opening through the bottom of the oven directly above the heater to permit the upward passage of heated air, and that there are peripheral openings by means of which the air in the oven, which has been slightly cooled by contact with the top and walls of the oven, is permitted to pass downwardly into the heating chamber, there to be re-heated and re-circulated.

The oven is very efficient and is inexpensive to manufacture. The efficiency is due to the facts, among others, that the oven is evenly heated due to the circulation of the air and that the heat is retained because the heated air is not permitted to escape. It will also be observed that the cooker is inexpensive to manufacture because the parts may be made of cheap stamped metal or like material and the heating element may be any standard resistance element. The device may be painted, enameled, or otherwise finished as desired. If enameled ware is used the enamel covering, being a poor conductor of heat, assists in retaining the heat within the cooker and, being easy to wash, enables the device to be easily cleansed.

Although a particular and preferred form of the invention has been described it is obvious that many modifications may be made and it is desired that the invention be construed as broadly as the limitations in the claims, taken in conjunction with the prior art, may allow.

Having thus described the invention what is claimed as new and desired to be secured by Letters Patent is:

1. A device of the class described comprising an air heating chamber, an oven above the air heating chamber communicating therewith by means of a central up-take opening extending through the bottom of the oven and the top of the heating chamber, said oven also communicating with the heating chamber by means of peripheral down-draft openings at the bottom of the oven, whereby a closed circulation is established through the oven and the heating chamber and the heated air which passes upward into the oven through the central opening circulates through the oven and down along the walls thereof and through the peripheral openings into the heating chamber where it is re-heated and re-circulated to the oven again through the central opening.

2. A device of the class described comprising an air heating chamber, an oven above the heating chamber communicating therewith by means of a central up-take opening extending through the bottom of the oven and the top of the heating chamber, said oven also communicating with the heating chamber by means of peripheral down-draft openings at the bottom of the oven, and an electric heating unit directly below the central opening, whereby a natural closed circulation is established from the heating element through the oven and heating chamber by means of the central up-take opening and the heated air which passes upward into the oven through the central opening circulates through the oven and down along the walls thereof and through the peripheral openings into the heating chamber where it is re-heated and re-circulated to the oven again through the central opening.

3. A device of the class described comprising an air heating chamber having two parts separable from one another along a line intermediate of the top and bottom of said chamber, an oven above the heating chamber communicating therewith by means of a central up-take opening extending through the bottom of the oven and the top of the heating chamber, said oven also communicating with the heating chamber by means of peripheral down-draft openings and the bottom of the oven whereby the oven and the upper part of the heating chamber may be placed over any suitable heating unit and a closed circulation is established through the oven and heating chamber and the heated air which passes upward into the oven through the central opening circulates through the oven and down along the walls thereof and through the peripheral openings into the heating chamber where it is heated and re-circulated to the oven again through the central opening.

4. The combination with a vessel having a chamber therein, of an electric heating element within the chamber and a recirculating baffle situated above the heating element and formed to present a central uptake opening and peripheral down-draft openings whereby the air heated by the heating element will rise through the central uptake opening and the cooler air will gravitate downwardly through the peripheral openings and after being reheated will rise again through the central opening thus establishing a closed circulation.

In testimony whereof, I have signed my name to this specification.

RALPH J. PATTERSON.